(12) United States Patent
Zhou et al.

(10) Patent No.: US 7,109,969 B2
(45) Date of Patent: Sep. 19, 2006

(54) ELECTROPHORETIC DISPLAY PANEL

(75) Inventors: Guofu Zhou, Eindhoven (NL); Mark Thomas Johnson, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 116 days.

(21) Appl. No.: 10/515,464

(22) PCT Filed: May 13, 2003

(86) PCT No.: PCT/IB03/01992

§ 371 (c)(1),
(2), (4) Date: Nov. 22, 2004

(87) PCT Pub. No.: WO03/100758

PCT Pub. Date: Dec. 4, 2003

(65) Prior Publication Data

US 2005/0162378 A1 Jul. 28, 2005

(30) Foreign Application Priority Data

May 24, 2002 (EP) ..................... 2077017
Sep. 16, 2002 (EP) ..................... 2078823

(51) Int. Cl.
*G09G 3/34* (2006.01)

(52) U.S. Cl. .................. 345/107; 359/296; 349/86

(58) Field of Classification Search .......... 349/86, 349/72, 199, 107; 359/296, 395
See application file for complete search history.

(56) References Cited

U.S. PATENT DOCUMENTS 6,326,944 B1 * 12/2001 MacLean et al. .......... 345/106
6,426,737 B1 * 7/2002 MacLean et al. .......... 345/107

\* cited by examiner

*Primary Examiner*—Jimmy H. Nguyen

(57) ABSTRACT

The electrophoretic display panel (1) for displaying a picture, has a first and a second opposed substrate (8,9), an electrophoretic medium (5) between the substrates (8,9), a plurality of pixels (2), a first and a second electrode (3,4) associated with each pixel (2), drive means (100) and a temperature probe (11). The electrophoretic medium (5) has charged particles (6) in a fluid. The first and the second electrode (3,4) are able to receive a potential difference having a duration and a level. The drive means (100) are able to control the potential differences for displaying the picture, and the temperature probe (11) is able to measure a temperature indicative for the medium temperature. For the display panel (1) to be able to have pixels (2) with substantially reproducible appearances requiring relatively little energy independent of the ambient temperature, the drive means (100) are able to receive the measured temperature from the temperature probe (11) and to control the potential differences in dependence of the measured temperature.

6 Claims, 2 Drawing Sheets

ELECTROPHORETIC DISPLAY PANEL

The invention relates to an electrophoretic display panel for displaying a picture.

BACKGROUND AND SUMMARY OF THE INVENTION

An embodiment of the electrophoretic display panel of the type mentioned in the opening paragraph is described in non-prepublished European Patent application 02078456.7 (PHNL020754).

In the described electrophoretic display panel, each pixel of the plurality of pixels has, during the display of the picture, an appearance determined by the position of the charged particles between the electrodes. The position of the particles depends on the potential difference as the particles migrate through the fluid as a consequence of the potential difference. The migration of the particles through the fluid also depends on the viscosity of the fluid. As the viscosity of the fluid is determined by the medium temperature, the position of the particles depends not only on the potential difference, but also on the medium temperature. The display panel comprises heating means and is thereby able to have a predetermined substantially constant medium temperature above ambient temperature. As a result, the display panel is able to have pixels with substantially reproducible appearances at the predetermined medium temperature. The heating means heat the medium to the predetermined medium temperature, which may be relatively highly power consuming, e.g. if the predetermined medium temperature is substantially higher than the ambient temperature. The predetermined medium temperature is chosen relatively high to be able to change the appearances of the pixels in a relatively short interval.

It is a drawback of the described display panel that it requires relatively high energy to obtain therewith pixels with substantially reproducible appearances independent of the ambient temperature.

It is an object of the invention to provide a display panel of the kind mentioned in the opening paragraph which is able to have pixels with substantially reproducible appearances requiring relatively little energy independent of the ambient temperature.

To achieve this object, the display panel in accordance with the invention is specified in claim 1.

The invention is based on the insight that, if the dependency of the appearances of the pixels on the medium temperature is compensated for by the potential differences, the appearances of the pixels are substantially reproducible. This dependency is compensated for by the potential differences without the need for heating means regulating the medium temperature. As relatively low power consuming electrical circuits can be used to perform the compensation, the appearances of the pixels are substantially reproducible requiring relatively little energy independent of the ambient temperature. As the drive means are able to receive the measured temperature indicative for the medium temperature from the temperature probe and to control the potential differences in dependence of the measured temperature, the display panel is able to have pixels with substantially reproducible appearances requiring relatively little energy independent of the ambient temperature. This is in contrast to the display panel described in non-prepublished European Patent application 02078456.7 (PHNL020754) which requires, due to the relatively high power consuming heating means, relatively high energy to have pixels with substantially reproducible appearances if the predetermined medium temperature is maintained at a substantially higher level than the ambient temperature. Furthermore, the prior art display panel does not have pixels with substantially reproducible appearances at an ambient temperature above the predetermined medium temperature, because the heating means are unable to cool the medium to the predetermined medium temperature.

In an embodiment the drive means are able to control the durations in dependence of the measured temperature. The durations are relatively short if the medium is able to change relatively fast between two appearances and relatively long if the medium is only able to change relatively slow between two appearances. For instance, as the medium at 60° C. is able to change faster between two appearances than at 20° C., the durations at the higher temperature are shorter than the durations at the lower temperature.

In a modification of the last embodiment the drive means are able to control each duration to consist of a number of intervals of equal time period, the number being determined by the picture to be displayed and the measured temperature, and the time period being constant Then only the number of intervals has a different value if the measured temperature has changed.

In another modification of the last embodiment the drive means are able to control each duration to consist of a number of intervals of equal time period, the number being determined by the picture to be displayed and the time period being determined by the measured temperature. Then only the time period has a different value if the measured temperature has changed.

In another embodiment the drive means are able to control the levels in dependence of the measured temperature. The levels are relatively low if the medium is able to change relatively fast between two appearances and relatively high if the medium is only able to change relatively slow between two appearances. For instance, as the medium having a temperature of 60° C. is able to change faster between two appearances than the medium having a temperature of 20° C., the levels at the higher temperature are shorter than the levels at the lower temperature.

If the first substrate comprises the first electrodes, and the second substrate comprises the second electrodes, the appearances of the pixels can relatively easy be changed compared to the display panel having one of the substrates comprising the first and the second electrode.

These and other aspects of the display panel of the invention will be further elucidated and described with reference to the drawings, in which.

In all the Figures corresponding parts are referenced to by the same reference numerals.

Figure 1:
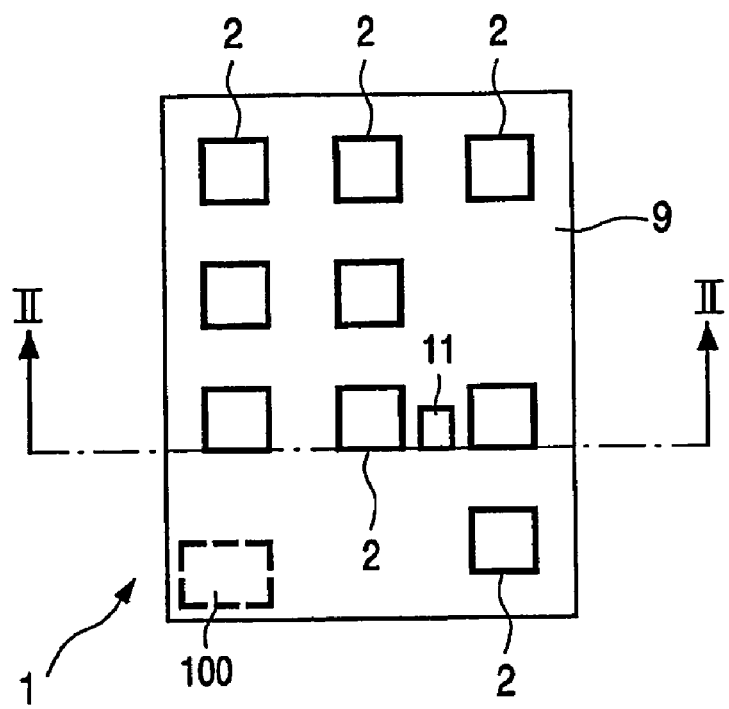
FIG. 1 shows diagrammatically a front view of a first embodiment of the display panel.
Figure 2:
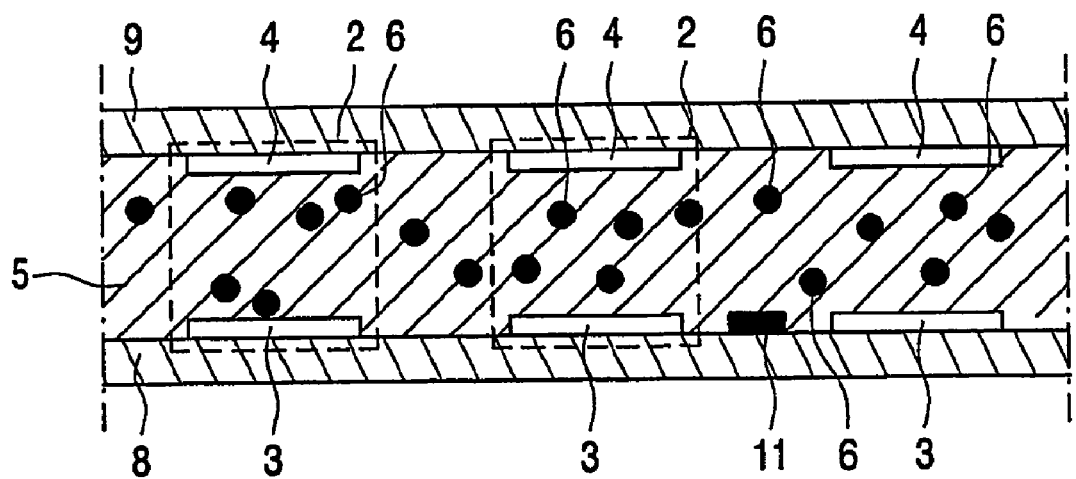
FIG. 2 shows diagrammatically a cross-sectional view along II—II in FIG. 1.

FIGS. 1 and 2 show the first embodiment of the display panel 1 having a second substrate 9 and a plurality of pixels 2. The pixels 2 are arranged along substantially straight lines in a two-dimensional structure. Other arrangements of the pixels 2 are also possible, e.g. a honeycomb arrangement. The display panel 1 has a first substrate 8 and a second opposed substrate 9. An electrophoretic medium 5 is present between the substrates 8,9. The electrophoretic medium 5 comprises for instance negatively charged black particles 6 in a white fluid. Electrophoretic media are known per se from e.g. U.S. Pat. No. 5,961,804, U.S. Pat. No. 6,120,839 and U.S. Pat. No. 6,130,774 and can e.g. be obtained from E Ink Corporation. A first and a second electrode 3,4 are associated with each pixel 2. The electrodes 3,4 are able to receive a potential difference. In FIG. 2 the first substrate 8 has for each pixel 2 a first electrode 3, and the second substrate 9 has for each pixel 2 a second electrode 4. When the charged particles 6 are positioned near the first electrode 3 due to a potential difference having a level of 15 Volts, the pixel 2 has a first appearance, i.e. white. When the charged particles 6 are positioned near the second electrode 4, due to a potential difference of opposite polarity, having a level of −15 Volts, the pixel 2 has a second appearance, i.e. black. A temperature probe 11, e.g. present on the surface of the first substrate 8 facing the medium, is able to measure a temperature indicative for the medium temperature. Furthermore, the drive means 100 are able to control the potential differences for displaying the picture, to receive the measured temperature from the temperature probe 11, and to control the potential differences in dependence of the measured temperature.

Figure 3:
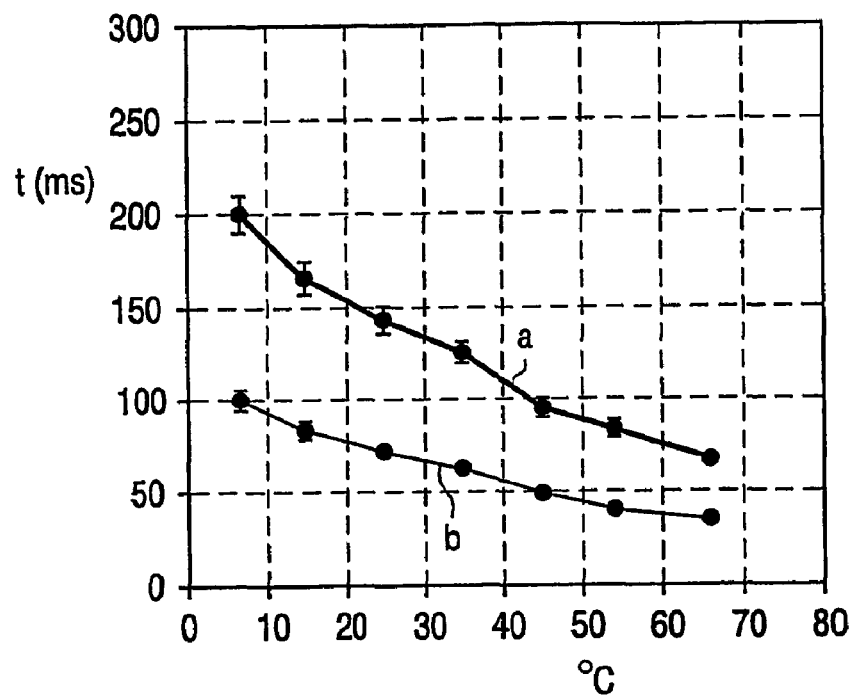
FIG. 3 shows in a graphical form the relation between the measured temperature and the durations for the first embodiment.

FIG. 3 shows the relation between the measured temperature and the durations of the potential differences for the first embodiment. The levels of the potential differences are 15 Volts. The distance between the electrodes 3,4 is about 80 micrometer. The layer of electrophoretic medium 5 has a thickness of about 50 micrometer. Furthermore, a layer of polymer binder material having a thickness of about 30 micrometer is present between the electrodes 3,4. The line 'a' is related to a change in appearance of the pixel from black to white, denoted as transition B-W, and the line 'b' is related to a change in appearance of the pixel from dark gray to light gray, denoted as transition DG-LG. The durations decrease with increasing measured temperature. In the first embodiment the drive means 100 are able to control durations of the potential differences in dependence of the measured temperature according to FIG. 3. Therefore, the dependency of the appearances of the pixels on the medium temperature is compensated for by the potential differences and the display panel 1 is able to have pixels 2 with substantially reproducible appearances requiring relatively little energy independent of the ambient temperature. The relation between the measured temperature and the durations may be incorporated in the drive means 100 by means of a look-up-table. Furthermore, FIG. 3 shows that the duration of the transition B-W is substantially proportional to the duration of the transition DG-LG. Therefore, in a variation of the first embodiment the drive means 100 are able to control each duration to consist of a number of intervals of equal time period, the number being determined by the picture to be displayed and the measured temperature, and the time period being constant. In another variation of the first embodiment the drive means 100 are able to control each duration to consist of a number of intervals of equal time period, the number being determined by the picture to be displayed and the time period being determined by the measured temperature.

Figure 4:
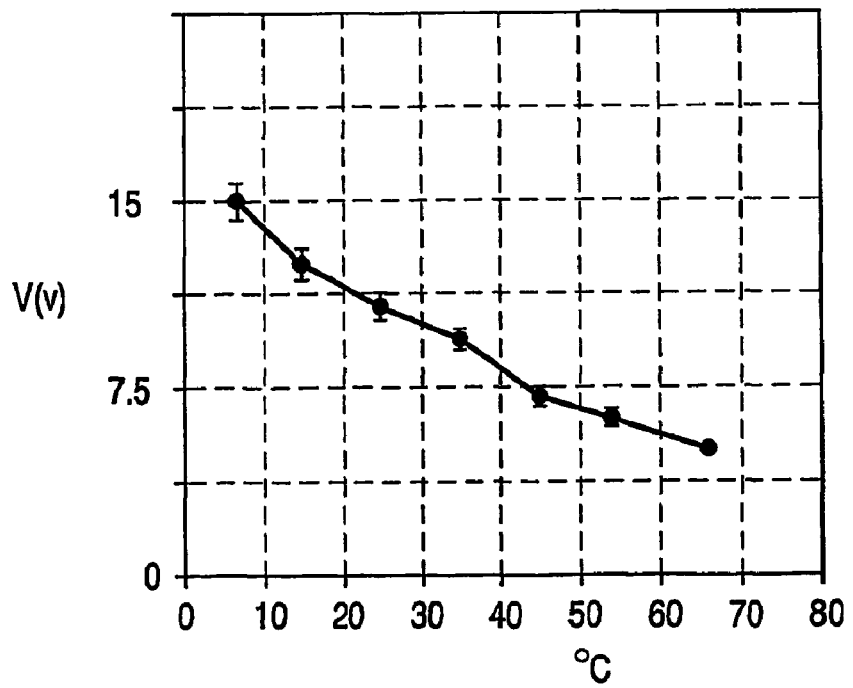
FIG. 4 shows in a graphical form the relation between the measured temperature and the levels for a second embodiment.

FIG. 4 shows the relation between the measured temperature and the levels of the potential differences for a second embodiment. The durations of the potential differences are 200 ms. The distance between the electrodes 3,4 is about 80 micrometer. The layer of electrophoretic medium 5 has a thickness of about 50 micrometer. Furthermore, a layer of polymer binder material having a thickness of about 30 micrometer is present between the electrodes 3,4. The relation is related to the transition B-W. The levels decrease with increasing measured temperature. In the second embodiment the drive means 100 are able to control levels of the potential differences in dependence of the measured temperature according to FIG. 4. The relation between the measured temperature and the levels may be incorporated in the drive means 100 by means of a look-up-table.

The invention claimed is:

1. An electrophoretic display panel for displaying a picture, comprising:
   a first and a second opposed substrate;
   an electrophoretic medium between the substrates, the electrophoretic medium comprising charged particles in a fluid;
   a plurality of pixels;
   a first and a second electrode associated with each pixel for receiving a potential difference having a duration and a level;
   drive means being able to control the potential differences for displaying the picture; and
   a temperature probe being able to measure a temperature indicative for a medium temperature, wherein the drive means are further able to receive the measured temperature from the temperature probe and to control the potential differences in dependence of the measured temperature.

2. A display panel as claimed in claim 1 characterized in that the drive means are able to control the durations in dependence of the measured temperature.

3. A display panel as claimed in claim 2 characterized in that the drive means are able to control each duration to consist of a number of intervals of equal time period, the number being determined by the picture to be displayed and the measured temperature, and the time period being constant.

4. A display panel as claimed in claim 2 characterized in that the drive means are able to control each duration to consist of a number of intervals of equal time period, the number being determined by the picture to be displayed and the time period being determined by the measured temperature.

5. A display panel as claimed in claim 1 characterized in that the drive means are able to control the levels in dependence of the measured temperature.

6. A display panel as claimed in claim 1, characterized in that the first substrate comprises the first electrodes, and the second substrate comprises the second electrodes.

* * * * *